United States Patent
Bernhardt et al.

(10) Patent No.: US 12,449,264 B2
(45) Date of Patent: Oct. 21, 2025

(54) METHOD, APPARATUS, AND COMPUTER PROGRAM PRODUCT FOR ANONYMIZING SENSOR DATA

(71) Applicant: HERE GLOBAL B.V., Eindhoven (NL)

(72) Inventors: Bruce Bernhardt, Chicago, IL (US); Leon Stenneth, Chicago, IL (US); Advait Mohan Raut, Mumbai (IN)

(73) Assignee: HERE GLOBAL B.V., Eindhoven (NL)

( * ) Notice: Subject to any disclaimer, the term of this patent is extended or adjusted under 35 U.S.C. 154(b) by 275 days.

(21) Appl. No.: 17/933,607

(22) Filed: Sep. 20, 2022

(65) Prior Publication Data

US 2024/0094010 A1    Mar. 21, 2024

(51) Int. Cl.
*G01C 21/32* (2006.01)
*G01C 21/34* (2006.01)
(Continued)

(52) U.S. Cl.
CPC ............ *G01C 21/32* (2013.01); *G08G 1/0112* (2013.01); *H04W 12/02* (2013.01); *G01C 21/30* (2013.01); *G01C 21/3484* (2013.01)

(58) Field of Classification Search
CPC .... G01C 21/30; G01C 21/32; G01C 21/3484; G08G 1/0112; H04W 12/02
See application file for complete search history.

(56) References Cited

U.S. PATENT DOCUMENTS 8,463,289 B2 *   6/2013   Shklarski ............... H04W 12/02
                                                       455/410
9,170,111 B2 *  10/2015   Boschker ............ G01C 21/3844
(Continued)

FOREIGN PATENT DOCUMENTS

EP       3917177 A1 * 12/2021    ......... G06F 21/6254
EP       3 944 113         1/2022

OTHER PUBLICATIONS

DXC Technology, "How Anonymization Can Solve Autonomous Driving Data Privacy Changes", (Aug. 2021), 7 pages.
(Continued)

*Primary Examiner* — Christian Chace
*Assistant Examiner* — Richard Edwin Geist
(74) *Attorney, Agent, or Firm* — ALSTON & BIRD LLP

(57) ABSTRACT

Embodiments described herein relate to anonymizing sensor data through the use of map data. Methods include: receiving sensor data defining a trajectory; map-matching the sensor data using a map-matching algorithm to a plurality of road segments of a map database to generate a sequence of map-matched sensor data elements; determining a first value representing anonymization associated with a start of the trajectory; determining a second value representing anonymization associated with an end of the trajectory; determining first map-matched sensor data elements at the start of the trajectory to be redacted based on the first value; determining second map-matched sensor data elements at the end of the trajectory to be redacted based on the second value; and transmitting sensor data associated with elements in the sequence of map-matched sensor data elements between the first map-matched sensor data elements and the second map-matched sensor data elements.

20 Claims, 6 Drawing Sheets

(51) Int. Cl.
*G08G 1/01* (2006.01)
*H04W 12/02* (2009.01)
*G01C 21/30* (2006.01)

(56) References Cited

U.S. PATENT DOCUMENTS

| | | | |
|---|---|---|---|
| 9,347,784 B2* | 5/2016 | Inoue | G08G 1/0112 |
| 10,601,786 B2 | 3/2020 | Whaley et al. | |
| 10,663,305 B2* | 5/2020 | Balu | G08G 1/012 |
| 10,664,616 B2* | 5/2020 | Herlocker | G01C 21/3811 |
| 11,317,247 B1* | 4/2022 | Bennati | G08G 1/012 |
| 11,703,337 B2* | 7/2023 | Bennati | G01C 21/3617 |
| | | | 701/411 |
| 11,805,391 B2* | 10/2023 | Vidyakina | H04W 4/029 |
| 11,921,890 B2* | 3/2024 | Bennati | G06F 16/285 |
| 2013/0261954 A1 | 10/2013 | Boschker et al. | |
| 2017/0358204 A1 | 12/2017 | Modica et al. | |
| 2018/0268168 A1 | 9/2018 | Herlocker et al. | |
| 2018/0288007 A1 | 10/2018 | Poornachandran et al. | |
| 2021/0403004 A1 | 12/2021 | Alvarez et al. | |
| 2022/0028267 A1* | 1/2022 | Bennati | G01C 21/3461 |

OTHER PUBLICATIONS

Partial European Search Report for European Application No. 23197515.2 dated Mar. 4, 2024, 11 pages.
Extended European Search Report for European Application No. 23197515.2 dated Jun. 7, 2024, 11 pages.

* cited by examiner

| Category for Start of Trajectory as Presented by the Device/Vehicle | Category for End of Trajectory as Presented by the Device/Vehicle | Assigned N Value | Assigned K Value |
|---|---|---|---|
| none | light | 0 | 1 |
| heavy | none | 4 | 0 |
| medium | medium | 2 | 2 |
| light | heavy | 1 | 4 |
| heavy | heavy | 4 | 4 |

FIG. 3

| Raw sensor data including GPS readings | Map matched sensor data including GPS readings |
|---|---|
| Sensor data [1] | Map-Matched Sensor data [1], FC4 |
| Sensor data [2] | Map-Matched Sensor data [2], FC1 |
| Sensor data [3] | Map-Matched Sensor data [3], FC1 |
| Sensor data [4] | Map-Matched Sensor data [4], FC1 |
| Sensor data [5] | Map-Matched Sensor data [5], FC2 |
| Sensor data [6] | Map-Matched Sensor data [6], FC5 |

FIG. 4

| Raw sensor data including GPS readings | Map matched sensor data including GPS readings |
|---|---|
| Sensor data [1] | Map-Matched Sensor data [1], FC4 |
| Sensor data [2] | Map-Matched Sensor data [2], FC4 |
| Sensor data [3] | Map-Matched Sensor data [3], FC4 |
| Sensor data [4] | Map-Matched Sensor data [4], FC4 |
| Sensor data [5] | Map-Matched Sensor data [5], FC2 |
| Sensor data [6] | Map-Matched Sensor data [6], FC1 |
| Sensor data [7] | Map-Matched Sensor data [7], FC1 |
| Sensor data [8] | Map-Matched Sensor data [8], FC1 |
| Sensor data [9] | Map-Matched Sensor data [9], FC2 |
| Sensor data [10] | Map-Matched Sensor data [10], FC5 |
| Sensor data [11] | Map-Matched Sensor data [11], FC5 |
| Sensor data [12] | Map-Matched Sensor data [12], FC5 |

FIG. 5

METHOD, APPARATUS, AND COMPUTER PROGRAM PRODUCT FOR ANONYMIZING SENSOR DATA

TECHNOLOGICAL FIELD

An example embodiment of the present disclosure relates to the anonymization of sensor data, and more particularly, to anonymizing sensor data through the use of map data.

BACKGROUND

Service providers and device manufacturers (e.g., wireless, cellular, navigation, etc.) are continually challenged to deliver value and convenience to consumers by providing compelling and useful services. Location-based services have been developed to provide users with useful and relevant information regarding route planning and to facilitate route guidance along the way. Substantially static data regarding roadways is used in conjunction with dynamic data, such as traffic, construction, and incident information to provide accurate and timely information to a driver to help route planning and decision making.

Data received from infrastructure monitoring systems and crowd-sourced data has become ubiquitous and may be available for facilitating route guidance and navigation system information. However, this data can be mined to provide various other services to users and to grow the availability of location-based services. The provision of location-based services is dependent upon understanding the location of a user requesting the services. Maintaining anonymity while also being able to provide location-based services is a challenge.

BRIEF SUMMARY

A method, apparatus, and computer program product are provided in accordance with an example embodiment described herein for the anonymization of sensor data, and more particularly, to anonymizing sensor data through the use of map data. According to an example embodiment, an apparatus is provided including at least one processor and at least one memory including computer program code, the at least one memory and computer program code configured to, with the processor, cause the apparatus to at least: receive sensor data defining a trajectory; map-match the sensor data using a map-matching algorithm to a plurality of road segments of a map database to generate a sequence of map-matched sensor data elements; determine a first value representing anonymization associated with a start of the trajectory; determine a second value representing anonymization associated with an end of the trajectory; determine first map-matched sensor data elements at the start of the trajectory to be redacted based on the first value; determine second map-matched sensor data elements at the end of the trajectory to be redacted based on the second value; and transmit map-matched sensor data elements in the sequence of map-matched sensor data elements between the first map-matched sensor data elements and the second map-matched sensor data elements.

According to certain embodiments, the sequence of map-matched sensor data elements includes a sequence of map-matched sensor data and a road segment functional class of each map-matched sensor data element of the sequence. According to an example embodiment, the first value includes an integer identifying an amount of sensor data to be redacted from the sequence of map-matched sensor data elements. According to an example embodiment, the second value includes an integer identifying an amount of sensor data according to a functional class of a road segment of a corresponding map-matched sensor data element to be redacted from the sequence of map-matched sensor data elements.

According to some embodiments, the sensor data defining the trajectory includes time stamps associated with the sensor data, where the map-matched sensor data elements in the sequence of map-matched sensor data elements between the first map-matched sensor data elements and the second map-matched sensor data elements retain time stamps associated with the sensor data. The first value and the second value of an example embodiment are user configurable. The first value and the second value of an example embodiment are established based on historical preferences of a user. According to certain embodiments, the sensor data defining the trajectory includes a starting location and an ending location, where the first value is based, at least in part, on the starting location, and the second value is based, at least in part, on the ending location.

Embodiments provided herein include a computer program product including at least one non-transitory computer-readable storage medium having computer-executable program code portions stored therein, the computer-executable program code portions including program code instructions configured to: receive sensor data defining a trajectory; map-match the sensor data using a map-matching algorithm to a plurality of road segments of a map database to generate a sequence of map-matched sensor data elements; determine a first value representing anonymization associated with a start of the trajectory; determine a second value representing anonymization associated with an end of the trajectory; determine first map-matched sensor data elements at the start of the trajectory to be redacted based on the first value; determine second map-mated sensor data elements at the end of the trajectory to be redacted based on the second value; and transmit sensor data associated with elements in the sequence of map-matched sensor data elements between the first map-matched sensor data elements and the second map-matched sensor data elements.

According to certain embodiments, the sequence of map-matched sensor data elements includes a sequence of map-matched sensor data and a road segment functional class of each map-matched sensor data element of the sequence. According to some embodiments, the first value includes an integer identifying an amount of sensor data to be redacted from the sequence of map-matched sensor data elements. The second value of an example embodiment includes an integer identifying an amount of sensor data according to a functional class of a road segment of a corresponding map-matched sensor data element to be redacted from the sequence of map-matched sensor data elements.

According to some embodiments, the sensor data defining the trajectory includes time stamps associated with the sensor data, where the sensor data associated with elements in the sequence of map-matched sensor data elements between the first map-matched sensor data elements and the second map-matched sensor data elements retain time stamps associated with the sensor data. According to some embodiments, the first value and the second value are user-configurable values. According to some embodiments, the first value and the second value are established based on historical preferences of a user. According to certain embodiments, the sensor data defining the trajectory includes a starting location and an ending location, where the first value is based, at least in part on the starting location, and the second value is based, at least in part on the ending location.

Embodiments provided herein include a method including: receiving sensor data defining a trajectory; map-matching the sensor data using a map-matching algorithm to a plurality of road segments of a map database to generate a sequence of map-matched sensor data elements; determining a first value representing anonymization associated with a start of the trajectory; determining a second value representing anonymization associated with an end of the trajectory; determining first map-matched sensor data elements at the start of the trajectory to be redacted based on the first value; determining second map-matched sensor data elements at the end of the trajectory to be redacted based on the second value; and transmitting sensor data associated with elements in the sequence of map-matched sensor data elements between the first map-matched sensor data elements and the second map-matched sensor data elements.

According to certain embodiments, the sequence of map-matched sensor data elements includes a sequence of map-matched sensor data and a road segment functional class of each map-matched sensor data element of the sequence. According to some embodiments, the first value includes an integer identifying an amount of sensor data to be redacted from the sequence of map-matched sensor data elements. The second value of an example embodiment includes an integer identifying an amount of sensor data according to a functional class of a road segment of a corresponding map-matched sensor data element to be redacted from the sequence of map-matched sensor data elements.

Embodiments provided herein include an apparatus including: means for receiving sensor data defining a trajectory; means for map-matching the sensor data using a map-matching algorithm to a plurality of road segments of a map database to generate a sequence of map-matched sensor data elements; means for determining a first value representing anonymization associated with a start of the trajectory; means for determining a second value representing anonymization associated with an end of the trajectory; means for determining first map-matched sensor data elements at the start of the trajectory to be redacted based on the first value; means for determining second map-matched sensor data elements at the end of the trajectory to be redacted based on the second value; and means for transmitting sensor data associated with elements in the sequence of map-matched sensor data elements between the first map-matched sensor data elements and the second map-matched sensor data elements.

According to certain embodiments, the sequence of map-matched sensor data elements includes a sequence of map-matched sensor data and a road segment functional class of each map-matched sensor data element of the sequence. According to some embodiments, the first value includes an integer identifying an amount of sensor data to be redacted from the sequence of map-matched sensor data elements. The second value of an example embodiment includes an integer identifying an amount of sensor data according to a functional class of a road segment of a corresponding map-matched sensor data element to be redacted from the sequence of map-matched sensor data elements. According to some embodiments, a computer program product may be provided. For example, a computer program product including instruction which, when the program is executed by a computer, cause the computer to carry out the steps described herein.

BRIEF DESCRIPTION OF THE DRAWINGS

Figure 1:
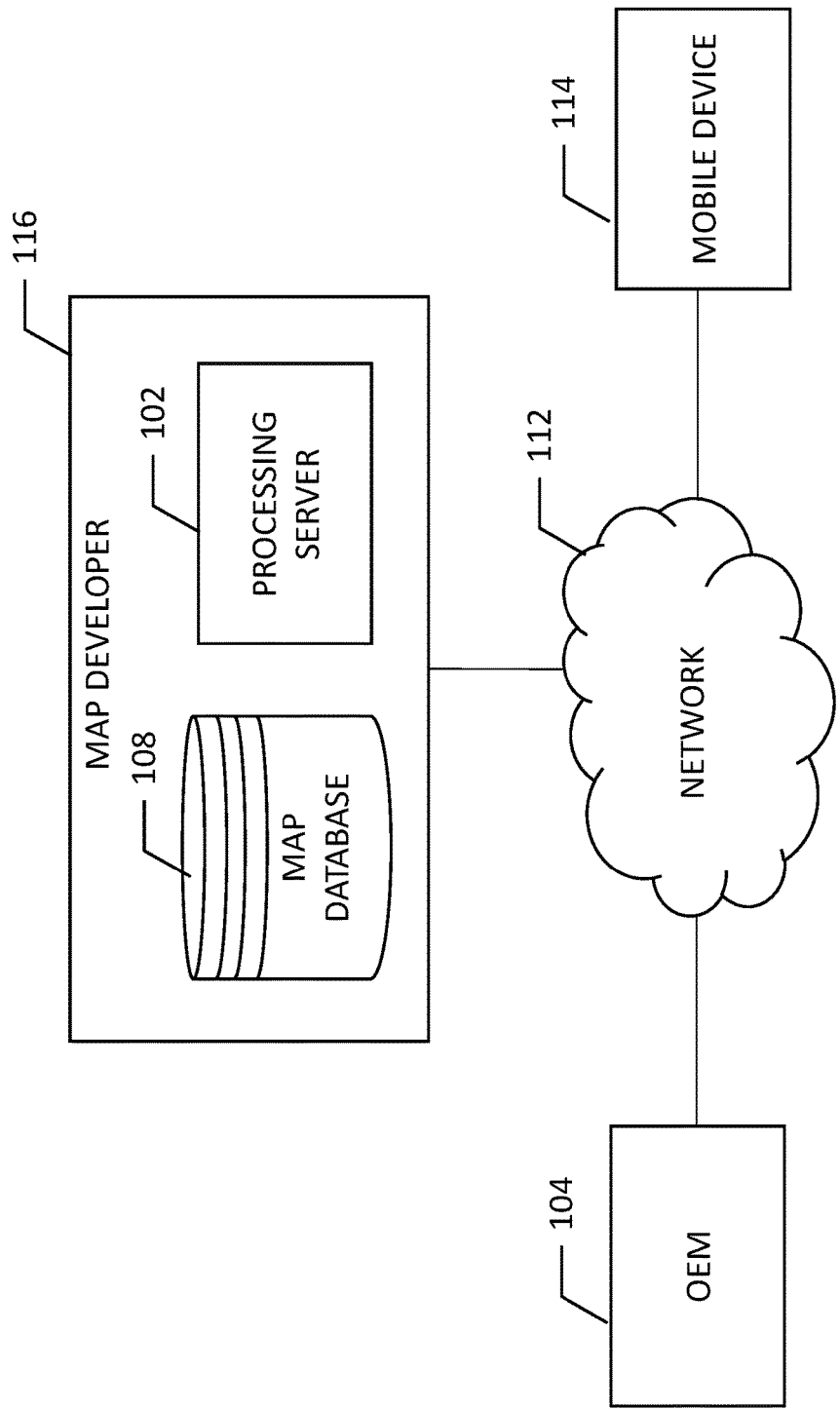
Figure 2:
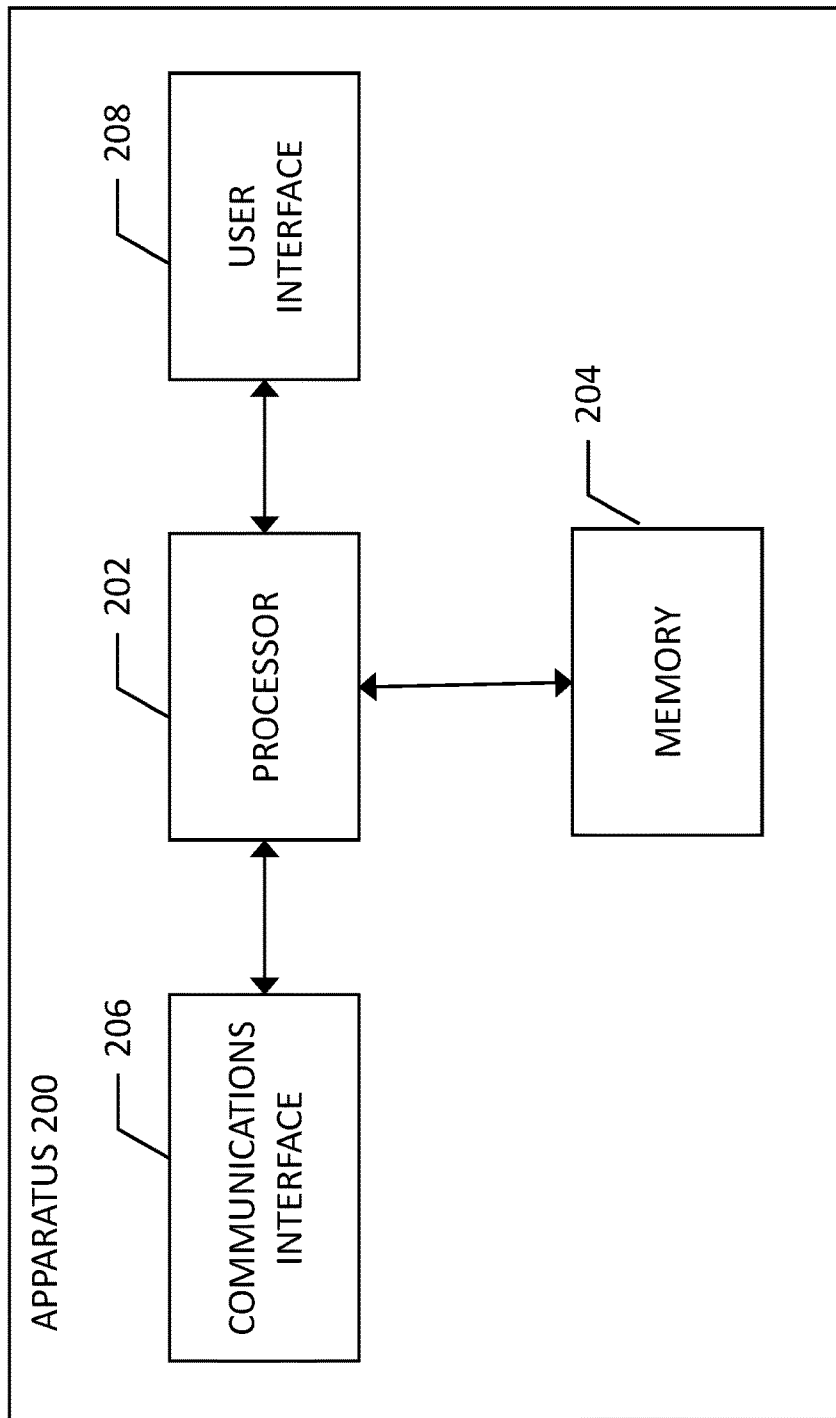
Figure 6:
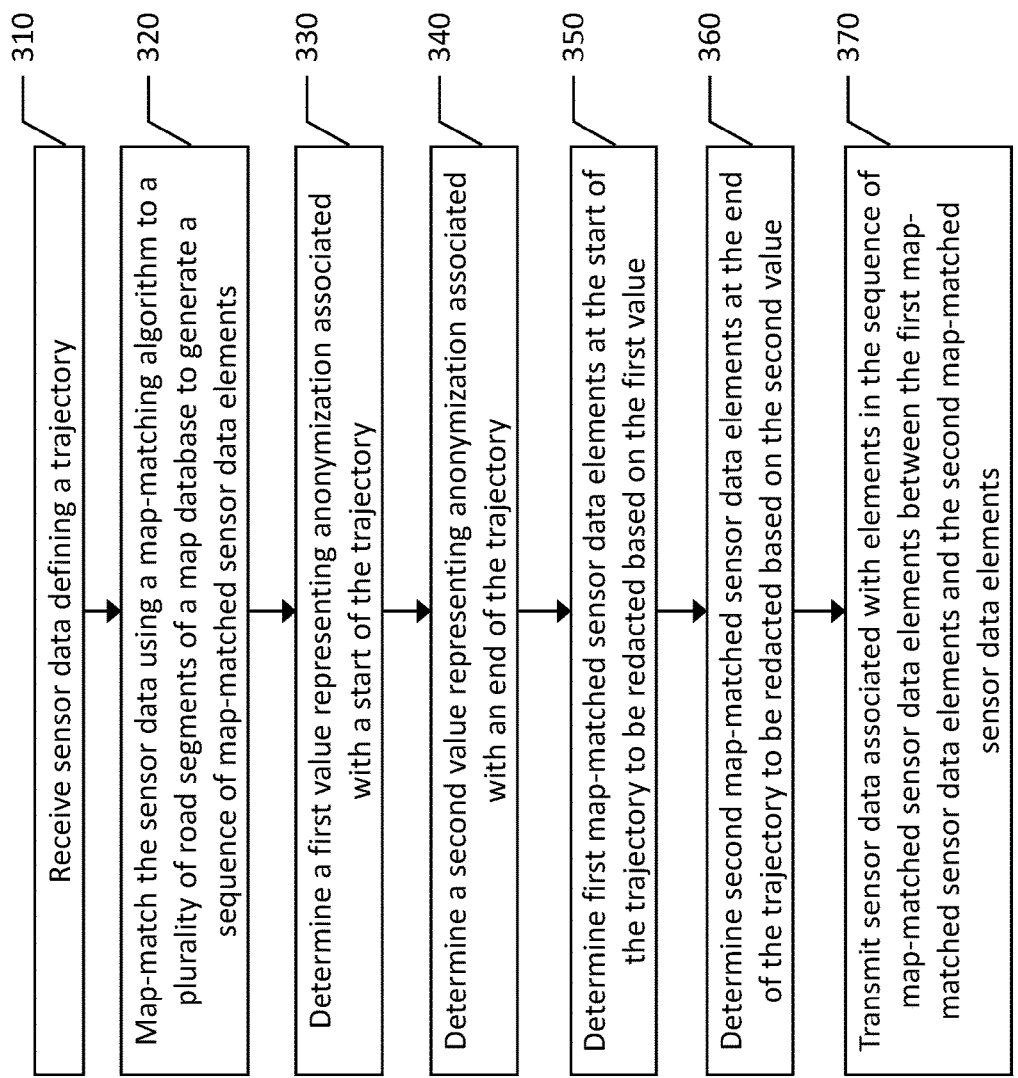

Having thus described example embodiments of the disclosure in general terms, reference will now be made to the accompanying drawings, which are not necessarily drawn to scale, and wherein:

FIG. 1 illustrates a communications diagram in accordance with an example embodiment of the present disclosure;

FIG. 2 is a block diagram of an apparatus that may be specifically configured for anonymizing sensor data through the use of map data in accordance with an example embodiment of the present disclosure;

FIG. 3 illustrates a table depicting values of N and K as they correlate to relative measures of privacy according to an example embodiment of the present disclosure;

FIG. 4 illustrates a table depicting raw sensor data including GPS readings and map-matched sensor data including GPS readings according to an example embodiment of the present disclosure;

FIG. 5 illustrates another table depicting raw sensor data including GPS readings and map-matched sensor data including GPS readings according to an example embodiment of the present disclosure; and FIG. 6 is a flowchart of a method anonymizing sensor data through the use of map data in accordance with an example embodiment of the present disclosure.

DETAILED DESCRIPTION

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present disclosure.

Sensor data or mobility data may be defined as a set of points or probe data points, each of which includes at least a latitude, longitude, and timestamp. Additional information may be associated with the sensor data, such as speed, heading, or other data. A sensor data trajectory includes a set of probe data points, where probe data points of a trajectory may include a trajectory identifier that associates the probe data points with one another. Sensor data captured in trajectories (trajectory data) identifies the movement of a user over time. Anonymization of trajectories while providing sufficient information for location based services to be effective requires a balance to be struck between valuable trajectory information including location information of probe data points while also introducing ambiguity for anonymization. Various anonymization algorithms may be applied to trajectory data that obfuscates a source of the trajectory data, thereby preserving the anonymity of a user.

Device manufacturers and service providers (e.g., Original Equipment Manufacturers (OEMs), operating system developers, cellular phone companies, etc.) have motivation to anonymize sensor data from devices before providing the sensor data to third-party entities, such as location-based service providers, map service providers, etc. If consumer sensor data is not anonymized, an adversary can decipher sensitive information, such as home address, work address, locations frequently visited (schools, stores, etc.). Anonymizing the sensor data beyond some degree can adversely affect the value of the data for analysis, predictive models, and for location-based services. According to some embodiments, an anonymization step may be required prior to any other processing to access the data incoming from a data provider, such as an OEM. Further, the data provider's anonymization may not be fully compliant with applicable standards required by the location-based service. According to certain embodiments, in data marketplace scenarios, data may require anonymization prior to posting a listing for the data in the marketplace. Embodiments provided herein include a novel method of anonymizing sensor data using map information. Embodiments provide an assurance of privacy of the sensor data while retaining the value of the sensor data for analysis purposes.

A method, apparatus, and computer program product are provided herein in accordance with an example embodiment for anonymizing sensor data through a process described as NK Functional Class Anonymization, where N and K are integer values and are related to a number of functional class links or road segments with sensor data that should be pruned from the beginning and/or end of a trajectory before the sensor data is provided to third parties. N is an amount of sensor data that should be removed from the front end of a trace or trajectory while K is an amount of sensor data via functional class of the road that should be removed from the end of the trajectory. The amount of sensor data, either N or K, can be established based on the specific anonymization strategy. For example, the amount can be all of the probe data associated with a number of road links, such as a number of road links of a particular functional class. Optionally, the amount of sensor data can be elements of the probe data for probe data associated with a number of road links of a functional class. For example, the amount can include all speed and heading information from probe data points along those links. As a further example, the amount of sensor data could include all identifying information within probe data and leaving only speed information from probe data associated with probe data points along the number of road links of a functional class. This may render the probe data points with some amount of sensor data removed still useful, such as for identifying a speed pattern along a road link. The functional class of the road is determined by fusing the sensor data with map data as an anonymization requirement of embodiments described herein.

Trajectories for a vehicle and/or mobile device can facilitate the use of location-based services for a variety of functions. However, trajectories themselves may provide substantial information regarding an origin, destination, and path taken by a user associated with a vehicle or mobile device raising privacy concerns. Location-based services rely on accurate location information to provide the most accurate and relevant service. Location-based services are useful to a variety of consumers who may employ location-based services for a wide range of activities. Services such as the identification of traffic location and density, providing information regarding goods and services available in a specific location, and identifying a target group of consumers in a particular location or who travel along a particular path, are among many other location-based services.

While location-based services are desirable for both consumers and for service providers, consumers are often concerned with the amount of information shared about their routines and activities. Thus, while consumers and service providers want to engage with location-based services, consumers generally desire to maintain some degree of privacy. Embodiments described herein provide a method, apparatus, and computer program product through which sensor data associated with an individual can be anonymized while still including valuable data useful for location-based service provision. Location information and more specifically, trajectory information can be gathered and shared in a manner that anonymizes the source of the information and makes unmasking of the source difficult. Embodiments provided herein reduce the likelihood of linkability of a target trajectory with a source of that target trajectory. The "linkability" is the ability of an adversary to associate the target trajectory with the source. The degree to which sensor data is anonymized can be quantified with a privacy score. A privacy score is a measure established as to the difficulty an adversary would have to associate a target trajectory with a source. If a privacy score is satisfied, information associated with the target trajectory may be provided to location-based services such that they may render a service related to the target trajectory and the source thereof.

To provide a method of anonymizing sensor data as described herein, a system as illustrated in FIG. 1 may be employed. FIG. 1 illustrates a communication diagram of an example embodiment of a system for implementing example embodiments described herein. The illustrated embodiment of FIG. 1 includes a map developer 116, a processing server 102 in data communication with an original equipment manufacturer (OEM) 104 and/or a geographic map database, e.g., map database 108 through a network 112, and one or more mobile devices 114. The OEM may be one form of a trajectory source from which a trajectory of a probe or mobile device is received. The trajectory source may optionally include third party service providers or app developers, for example. The mobile device 114 may be associated, coupled, or otherwise integrated with a vehicle, such as in a vehicle's head unit, infotainment unit, or an advanced driver assistance system (ADAS), for example. Additional, different, or fewer components may be provided. For example, many mobile devices 114 may connect with the network 112. The map developer 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

The OEM 104 may include a server and a database configured to receive probe data from vehicles or devices corresponding to the OEM. For example, if the OEM is a brand of automobile, each of that manufacturer's automobiles (e.g., mobile device 114) may provide probe data to the OEM 104 for processing. That probe data may be encrypted with a proprietary encryption or encryption that is unique to the OEM. The OEM may be the manufacturer or service provider for a brand of vehicle or a device. For example, a mobile device carried by a user (e.g., driver or occupant) of a vehicle may be of a particular brand or service (e.g., mobile provider), where the OEM may correspond to the particular brand or service. The OEM may optionally include a service provider to which a subscriber subscribes, where the mobile device 114 may be such a subscriber. While depicted as an OEM 104 in FIG. 1, other entities may function in the same manner described herein with respect to the OEM. For example, independent location-based service providers or other entities may participate and contribute in the same manner as described herein with respect to an OEM. As such, the OEM 104 illustrated in FIG. 1 is not limited to original equipment manufacturers, but may be any entity participating as described herein with respect to the OEMs.

The OEM 104 may be configured to access the map database 108 via the processing server 102 through, for example, a mapping application, such that the user equipment may provide navigational assistance to a user among other services provided through access to the map developer 116. According to some embodiments, the map developer 116 may function as the OEM, such as when the map developer is a service provider to OEMs to provide map services to vehicles from that OEM. In such an embodiment, the map developer 116 may or may not be the recipient of vehicle probe data from the vehicles of that manufacturer. Similarly, the map developer 116 may provide services to mobile devices, such as a map services provider that may be implemented on a mobile device, such as in a mapping application. According to such an embodiment, the map developer 116 may function as the OEM as the map developer receives the probe data from the mobile devices of users as they travel along a road network.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, functional class, street names, address ranges, speed limits, turn restrictions at intersections, and other navigation related attributes, as well as POIs, such as fueling stations, hotels, restaurants, museums, stadiums, offices, auto repair shops, buildings, stores, parks, etc.

According to certain embodiments described herein, for anonymization strategies relying, even in part, on functional classifications, each road within a map database has a functional class value applied. That functional class is based on factors such as traffic volume, traffic flow, traffic speed, and connectivity of the road segment. The values for functional class can include a numerical value, such as from one to five. According to an example embodiment, a functional class of one is the highest functional class level, allowing for high traffic volumes, maximum speed traffic movement, etc. A functional class one road segment network is generally closed and continuous. Functional class two road segments allow for high volume, high traffic speed between metropolitan areas and major cities. A network of functional class one and two road segments is generally closed and continuous. A road segment of a functional class three allows for high volume traffic movement at a lower level of mobility than functional class two roads. A road network of functional classes one through three is generally closed and continuous. A road segment of a functional class of four allows for high volume traffic movement at moderate speed between neighborhoods/cities. Functional class four roads connect functional class five roads to roads of a higher functional class. Road networks of road segments of classes one through four are generally closed and continuous. Road segments of functional class five may include roads and walkways not coded with a higher ranking. Additional functional classes may further define segments within functional class five. Functional class five (or lower) road segments provide local access to addresses and typically represent residential roads, walkways, pedestrian zones, and other non-arterial roads.

Distribution of a functional class network may not be standard on a global basis. Between countries or regions, the distribution of functional class values can differ and may depend upon the road network configuration for a country or region. Functional class values may be fluid. Functional class level one through four roads are connected to form a comprehensive road network for navigation of long distances, mid-range, and short routes. For example, long-distance routes are often calculated by searching the road network through progressively higher functional classes to get to a road of functional class one. The route continues exclusively on functional class one roads until travel is required through progressively lower functional classes in order to reach the destination. Different countries and regions may employ different functional class strategies, but can still employ embodiments described herein with similar functionality.

The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map developer. By way of example, the map developer can collect geographic data to generate and enhance the map database 108. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used to generate map geometries directly or through machine learning.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by mobile device 114, for example. The navigation-related functions can correspond to vehicle navigation, pedestrian navigation, or other types of navigation. While example embodiments described herein generally relate to vehicular travel, example embodiments may be implemented for bicycle travel along bike, watercraft travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., mobile device 114) to provide navigation and/or map-related functions. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example.

In one embodiment, the mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 114 for navigation and map functions such as guidance and map display, for example, and for determination of one or more personalized routes or route segments based on one or more calculated and recorded routes, according to some example embodiments.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn maneuvers there through.

The processing server 102 may receive probe data, directly or indirectly, from a mobile device 114, such as when the map developer is functioning as the OEM 104. According to some embodiments, a vehicle or mobile device 114 can perform the anonymization operation in which case the probe data is maintained locally within the vehicle or mobile device, and anonymized before sending to a service provider. Optionally, the map developer 116 may receive probe data indirectly from the mobile device 114, such as when the mobile device 114 provides probe data to the OEM 104, and the OEM provides certain elements of the probe data to the map developer 116. The OEM 104 may anonymize the probe data or otherwise process the probe data to maintain privacy of a user of the mobile device 114 before providing the data to the map developer 116. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102, either directly or indirectly, may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) may be representative of the location of a vehicle at a respective point in time and may be collected while a vehicle is traveling along a route. According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 and/or an OEM 104 may be embodied in an apparatus as illustrated in FIG. 2. According to an embodiment of a vehicle or mobile device 114 in which the anonymization is performed locally, the vehicle or mobile device 114 may be embodied by the apparatus as illustrated in FIG. 2. The apparatus, such as that shown in FIG. 2, may be specifically configured in accordance with an example embodiment of the present disclosure for measuring and quantifying the linkability of trajectory data, and more particularly, to measuring and quantifying the linkability of trajectory data based on similarities to other trajectory data. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more mobile devices 114 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

The apparatus 200 of some embodiments may be integrated with or otherwise on-board the vehicle whereby the apparatus 200 may be equipped with or in communication with (e.g., via communications interface 206) one or more sensors, such as a Global Navigation Satellite System (GNSS) sensor (e.g., GPS, Galileo, GLONASS, etc.), accelerometer, image sensor, inertial measurement unit (IMU), gyroscope, magnetic field sensor, etc. Any of the sensors may be used to sense information regarding the location, movement, positioning, or orientation of the apparatus for use in identifying a location of the apparatus 200. In some embodiments, the apparatus 200 may derive information regarding location, movement, position, or orientation of the apparatus 200 based on communication signals perceived by the communications interface 206 such as through signal triangulation or signal fingerprinting, for example. In some embodiments, the apparatus may combine both sensor information and communication signals to drive a location of the apparatus 200.

Location-based services (LBS) such as real-time traffic information, fleet management, and navigation among others, are based on the analysis of sensor data that users of such services provide. Sensor data is associated with a privacy level and accuracy value. An accuracy value is based on the intrinsic utility of data toward the generation of location-based services. The privacy value reflects the sensitive information that sensor data reveals about a user's habits, behaviors, and personal information such as their home and/or work address.

Location-based service providers endeavor to collect as much location data as possible to maximize the accuracy of the location-based services, while attempting to minimize the associated risks for the privacy of the users particularly as it relates to the inadvertent disclosure or misuse of data. To reduce the privacy risk, location-based service providers may apply privacy-enhancing algorithms on data. Privacy-enhancing algorithms function by removing or altering features of the data that may remove privacy, and this operation typically renders the data less accurate and thus less valuable for the location-based service provider.

Embodiments described herein anonymize sensor data using map data to guide the anonymization process. Methods determine an amount of sensor data to remove from a trajectory and functional classes of road segments or links that should be removed from an end of the trajectory. Further, embodiments avoid the use of temporal obfuscation which presents difficulty when using the sensor data for temporally-sensitive location-based services, such as traffic congestion. Embodiments maintain temporal consistency while anonymizing the sensor data generated.

Trajectory data as described herein is defined as a set of data points, each data point including a location and a timestamp. The location may be in the form of latitude and longitude, and potentially altitude. Additional information may be associated with a data point, such as speed, heading, etc. If a trajectory identifier is associated with each point, the trajectory data can be partitioned into a set of trajectories, each of which identifies the movement of a user over a period of time. For all but the shortest of trajectories, there will be a number of road segments at the beginning or end of the trajectory that will be pseudorandom in nature. Different routes will include different numbers of functional class roads at their beginning or end. This effectively provides for further uncertainty in the anonymization process described herein.

Location-based service providers may provide trajectory data and information associated with trajectories to customers, such as municipalities interested in traffic optimization, data producers (e.g., drivers who share their trajectory data with the service provider), or the like. Any trajectory that reveals a user's behavioral patterns (e.g., going from A to B) can potentially reveal privacy-sensitive information and locations.

Embodiments of the present disclosure provide a method, apparatus, and computer program product to anonymize sensor data through the use of map data. Embodiments ensure privacy of the source of the sensor data while providing valuable location data in a temporally accurate manner such that location-based service providers can use the anonymized sensor data to provide valuable and relevant services.

Embodiments described herein employ a process referred to as NK Functional Class Anonymization, where N and K are integer values and are related to the number of functional class links within sensor data that should be pruned from a beginning of the trajectory and from an end of the trajectory before the sensor data is provided to third parties. The value N is the amount of sensor data that should be removed from the beginning of the trajectory while K is the amount of sensor data via functional class of the road that should be removed from the end of the trajectory. The functional class of the road is determined by fusing the sensor data with map data as an anonymization requirement.

The anonymization of example embodiments is performed after map-matching of the sensor data. However, both the anonymized raw data points and the map-matched data points can be output after anonymization. The map-matching of the sensor data is used as assistance for the anonymization scheme described herein.

The anonymization process of example embodiments employing NK Functional Class Anonymization uses values of N and K that are defined for each data aggregator (e.g., OEM, cellular phone service providers, operating system developers, application developers, etc.) that collects the sensor data from the data sources. With the values of N and k defined at the data aggregator level, all sensor data sources providing data to that aggregator will have the same settings and anonymization strength (e.g., privacy score). Optionally, the values of N and K can be personalized for each device (e.g., mobile device, vehicle, etc.) or each user of a device (e.g., different drivers of a single vehicle). If the values of N and K are defined on a per-device or per-user basis, the privacy scheme is more personalized, and each device or each user could have a different privacy desire.

According to an example embodiment, N and K values of (0,0) imply N=0 and K=0, which implies that no anonymization is required. Values of (1,1) implies N=1 and K=1 which implies that light anonymization is required where only trajectory portions on the first functional class from the start and the last functional class matched is to be dropped before sharing the sensor data. Values (0,1) implies N=0 and K=1, which implies that no anonymization is required for the start of the trace, and only sensor data collected on the last functional class should be removed before sharing with a third party. Values (1,0) implies N=1 and K=0, which implies that no anonymization is required on the end of the trace, but for the start of the trace, sensor data that was collected on the first functional class should be suppressed.

The following constraints of the algorithm are employed in terms of N and K. Given sensor data that was map matched to road links or segments with a count of M functional classes:

$$0 \leq N \leq M$$

$$0 \leq K \leq M$$

$$N+K \leq M$$

If N+K=M, then no sensor data is provided from the data aggregator, and all sensor data is suppressed at anonymization.

Values of N and K can be learned for each device or each individual using a device. A user may define their own values for N and K for their device or for their profile of a shared device. Using historical values for N and K for each user, a system can predict values for N and K for the user. Embodiments can employ historical selections of N and K from a user in addition to map-based features (e.g., city, functional class of the road, etc.) and location-specific features (e.g., close points-of-interest (POIs)) to form a training data set. For example, if the system of example embodiments observes that historically a user is consistently selecting to not anonymize their data then the system could start to predict N=0 and K=0 for that user.

The system of example embodiments described herein can prompt a user for a level of anonymization desired as a category for trajectory start and trajectory end, and depending upon the user's selections, the system can select values of N and K for the user. For example, if a user is prompted for categories for trajectory start of "None", "Light", "Medium", and "Heavy", each category may be associated with a value for N. The table of FIG. 3 illustrates such correlation. The values for each of these categories may differ depending upon the anonymization strategy, and the values shown in FIG. 3 are merely examples of such values. The categories can be presented to a user for both the start and end of a trajectory, and after a user makes the selections, the system can assign the corresponding values of N and K.

FIG. 4 illustrates an example embodiment of a sensor trace for a mobile device in the form of a vehicle traveling along a trajectory. The first column entitled "Raw sensor data including GPS readings" is raw sensor data from the mobile device including location (through GPS readings) and other data, which may include time, speed, etc. The second column entitled "Map matched sensor data including GPS readings" reflects the map-matched sensor data, where the GPS locations are map-matched to road segments within the road network based on a map-matching algorithm. As the sensor data (e.g., probe data points) are map-matched to road segments, each instance of sensor data is also correlated to a functional class of the road to which it is map-matched. As such, the second column of data also includes the functional class of each row of sensor data. The functional classes are represented as FC1, FC2, FC3, FC4, and FC5. The functional classes can be represented through any functional class definitions available and may be based on the functional classes available within the map data for the region. Functional classifications can represent limited access expressways (e.g., interstates), other arterial roads that may be multilane highways, but may not have limited access, collector roads, and local roads (e.g., rural local, suburban local, and urban local).

With the sensor data of FIG. 4, if anonymization is set to N=0 and K=1 (e.g., set by user preference, default values, historical values, etc.), the anonymized data that is transmitted from the mobile device would include Map-Matched Sensor data [1] through Map-Matched Sensor data [5] of the sensor data of FIG. 4, with the last functional class FC5 of Map-Matched Sensor data [6] being cut from the sensor data before transmission. If the anonymization is set to N=1 and K=1, the anonymized data that is transmitted from the mobile device includes Map-Matched Sensor data [2] through Map-Matched Sensor data [5], with the first functional class FC4 of Map-Matched Sensor data [1] and the last functional class FC5 of Map-Matched Sensor data [6] being pruned from the trajectory before transmitting.

If the anonymization values are set to N=2 and K=1, then the anonymized data that is transmitted from the mobile device would include Map-Matched Sensor data [3] through Map-Matched Sensor data [5]. In the event the anonymization values are set to N=0 and K=0 (reflecting no anonymization), the anonymized data transmitted from the vehicle would include all of Map-Matched Sensor data [1] through Map-Matched Sensor data [6]. If the anonymization values are set to N=10 and K=10, such anonymization is not possible with only six elements of sensor data, such that no sensor data would be transmitted. The sensor data transmitted, while described above as map-matched, can optionally be raw sensor data as described further below.

The transmitting of map-matched sensor data can include publishing map-matched sensor data for consumption by one or more service providers or data aggregators for use in providing location-based services. Optionally, transmitting of map-matched sensor data can include authorizing release of the trajectory data, such as to service providers or data aggregators for use in providing location-based services. The transmitting of map-matched sensor data can include transmitting the map-matched sensor data to a traffic forecast application for inclusion in traffic data aggregation and prediction of future traffic, or when in real-time, identifying traffic as it occurs within a road network. Transmitting map-matched sensor data can further be provided to a map building application for use in generating, updating, and healing map data for the benefit of those navigating the geographic area covered by the map data.

FIG. 5 illustrates another example embodiment of an extended trajectory and the sensor data associated therewith. As with FIG. 4, the first column includes raw sensor data including GPS readings, while the second column includes map-matched sensor data including the GPS readings. In the event the values for the NK Functional Class Anonymization are selected as N=3 and K=2, the anonymized data that is transmitted from the mobile device prunes the first three lines of sensor data and the last two lines of sensor data, resulting in transmission of Map-Matched Sensor data [4] through Map-Matched Sensor data [10].

Embodiments described herein enable a user to select more or less anonymization at the start and/or the end of a trajectory. The desired anonymization by a user may differ depending upon the application and the user's comfort level with certain third party services. For example, a user may want a higher level of anonymization for a traffic data service provider as the user's specific trajectory may not be highly relevant to traffic data when aggregated with other device sensor data. Thus, the values of N and K, whether selected directly by a user or through preferences (such as those shown in FIG. 3) can be set as such. If a user wants a higher level of quality or context of a location-based service and is willing to sacrifice some degree of anonymization, the user may select a lower level of anonymization for another location-based service that may benefit from more location-related sensor data from the user. Thus, a user may select different levels of anonymization depending upon the third party service provider and/or the specific location-based service their data is being used for.

Anonymization can be performed on a full trajectory in post-processing (after a complete trajectory has been completed) or in near real-time cases where anonymization is performed as the trajectory is being traversed. When a full trajectory is received after being completely traversed, it is straightforward to determine the end or destination of the trajectory and to apply the K-links pruning described herein. However, during near real-time anonymization during trajectory generation, the end or destination of the trajectory is not known. To determine an end of the trajectory in order to ensure anonymization of the final K-links of the trajectory, the destination can be determined (e.g., from a navigation system with a destination of a route) or predicted, such as by user mobility patterns, scheduled appointments (e.g., doctor's appointment at a given location), or other methods of destination estimation. Such real-time or near real-time scenarios can be performed on a client device (e.g., within a vehicle or mobile device 114) as sending destinations to another entity can defeat the purpose of the anonymization.

Embodiments further provide the ability to alter privacy levels at a beginning of a trajectory and an end of a trajectory independently. For example, a person may be comfortable with lower privacy with respect to their destination when leaving from home than from the location of their home. In such a scenario, a person may want a higher privacy level at the start of trajectories emanating from their home, and a lower privacy level close to their destination, such that N will be greater than K for trajectories starting from home.

Embodiments provided herein can further be implemented to have privacy levels (values of N and/or K) dependent upon the origin and destination for their trajectories. For example, if a user wants privacy enhanced proximate their home locations, a home location may be identified at the user device. Trajectories emanating from the home may have a first value of N that is relatively large, and a value of K that is relatively smaller. Conversely, trajectories ending at home may have a value of N that is relatively small and a value of K that is relatively larger.

According to example embodiments described herein, a user may select certain locations for which higher privacy is desired (e.g., work and home), such that values of N or K may be influenced by whether the trajectory begins or ends at a location where higher privacy is desired. In such an embodiment, a user may select a value for N or K that is to be used when their trajectory begins or ends at a privacy sensitive location, respectively. According to such an embodiment, the privacy-sensitive location may be associated with a value, and that value can be used for N when the origin of a trajectory is the privacy-sensitive location, and that value can be used for K when the destination of the trajectory is the privacy-sensitive location.

Embodiments of the NK Functional Class Anonymization described herein can further be employed without temporal obfuscation that is used in some anonymization processes. Temporal randomization and obfuscation precludes location data of trajectories from being useful in temporally-sensitive location-based services, such as traffic and route planning. The NK Functional Class Anonymization described herein maintains temporal consistency that facilitates temporally-sensitive location-based services.

While location data from trajectories can be provided using the NK Functional Class Anonymization as described above, the location data can be map matched or raw location data. The map-matching process used in the algorithms described herein is necessary for the anonymization strategy in determining which sensor data to prune from a trajectory. However, once the sensor data is determined that is to be pruned, the raw sensor data corresponding to the sensor data to be transmitted can be provided to the third-party. For example, with reference to the sensor data of FIG. 4, with values of N=1 and K=1, the algorithm described herein would prune Sensor data [1] and Sensor data [6], and transmit raw Sensor data [2] through raw Sensor data [5].

Raw sensor data can be useful for various location-based services. For example, the map-matched sensor data of a device may not include a travel lane, and if the map-matched sensor data is provided to a third party, the ability to match the sensor data to a specific lane is lost. However, if raw sensor data is provided to the third party, preserving the original GPS readings and/or any other location identifiers, the third party can map-match the raw probe data to a road segment and to a lane thereof.

FIG. 6 illustrates a flowchart depicting methods according to an example embodiments of the present disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 6 illustrates a method for anonymizing sensor data through the use of map data. Sensor data defining a trajectory is received at 310. The sensor data is map-matched at 320 using a map-matching algorithm to a plurality of road segments of a map database to generate a sequence of map-matched sensor data elements. A first value is determined at 330 representing anonymization associated with a start of the trajectory. A second value is determined at 340 representing anonymization associated with an end of the trajectory. At 350, it is determined which first map matched sensor data elements at the start of the trajectory are to be redacted based on the first value. At 360, it is determined which second map matched sensor data elements at the end of the trajectory are to be redacted based on the second value. The sensor data associated with elements in the sequence of map-matched sensor data elements between the first map-matched sensor data elements and the second map-matched sensor data elements are transmitted at 370. The sensor data may be transmitted to a location-based service provider for provision of services associated with the location of the device generating the sensor data.

In an example embodiment, an apparatus for performing the method of FIG. 6 above may comprise a processor (e.g., the processor 202) configured to perform some or each of the operations (310-370) described above. The processor may, for example, be configured to perform the operations (310-370) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 310-370 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and computer program code configured to, with the processor, cause the apparatus to at least:
receive sensor data defining a trajectory;
map-match the sensor data using a map-matching algorithm to a plurality of road segments of a map database to generate a sequence of map-matched sensor data elements;
determine a first value representing anonymization associated with a start of the trajectory;
determine a second value representing anonymization associated with an end of the trajectory;
determine first map-matched sensor data elements at the start of the trajectory to be redacted based on the first value;
determine second map-matched sensor data elements at the end of the trajectory to be redacted based on the second value, wherein the second value comprises an integer identifying an amount of sensor data according to a functional class of a road segment of a corresponding map-matched sensor data element to be redacted from the sequence of map-matched sensor data elements; and
transmit map-matched sensor data elements in the sequence of map-matched sensor data elements between the first map-matched sensor data elements and the second map-matched sensor data elements.

2. The apparatus of claim 1, wherein the sequence of map-matched sensor data elements comprises a sequence of map-matched sensor data and a road segment functional class of each map-matched sensor data element of the sequence.

3. The apparatus of claim 2, wherein the first value comprises an integer identifying an amount of sensor data to be redacted from the sequence of map-matched sensor data elements.

4. The apparatus of claim 1, wherein the first value comprises an integer identifying an amount of sensor data according to a functional class of a road segment of a corresponding map-matched sensor data element to be redacted from the sequence of map-matched sensor data elements.

5. The apparatus of claim 1, wherein the sensor data defining the trajectory includes time stamps associated with the sensor data, wherein the map-matched sensor data elements in the sequence of map-matched sensor data elements between the first map-matched sensor data elements and the second map-matched sensor data elements retain time stamps associated with the sensor data.

6. The apparatus of claim 1, wherein the first value and the second value are user-configurable values.

7. The apparatus of claim 1, wherein the first value and the second value are established based on historical preferences of a user.

8. The apparatus of claim 1, wherein the sensor data defining the trajectory includes a starting location and an ending location, wherein the first value is based, at least in part, on the starting location, and the second value is based, at least in part, on the ending location.

9. A computer program product comprising at least one non-transitory computer-readable storage medium having computer-executable program code portions stored therein, the computer-executable program code portions comprising program code instructions configured to:
receive sensor data defining a trajectory;
map-match the sensor data using a map-matching algorithm to a plurality of road segments of a map database to generate a sequence of map-matched sensor data elements;
determine a first value representing anonymization associated with a start of the trajectory;
determine a second value representing anonymization associated with an end of the trajectory;
determine first map-matched sensor data elements at the start of the trajectory to be redacted based on the first value;
determine second map-matched sensor data elements at the end of the trajectory to be redacted based on the second value, wherein the second value comprises an integer identifying an amount of sensor data according to a functional class of a road segment of a corresponding map-matched sensor data element to be redacted from the sequence of map-matched sensor data elements; and
transmit sensor data associated with elements in the sequence of map-matched sensor data elements between the first map-matched sensor data elements and the second map-matched sensor data elements.

10. The computer program product of claim 9, wherein the sequence of map-matched sensor data elements comprises a sequence of map-matched sensor data and a road segment functional class of each map-matched sensor data element of the sequence.

11. The computer program product of claim 10, wherein the first value comprises an integer identifying an amount of sensor data to be redacted from the sequence of map-matched sensor data elements.

12. The computer program product of claim 9, wherein the first value comprises an integer identifying an amount of sensor data according to a functional class of a road segment of a corresponding map-matched sensor data element to be redacted from the sequence of map-matched sensor data elements.

13. The computer program product of claim 9, wherein the sensor data defining the trajectory includes time stamps associated with the sensor data, wherein the sensor data associated with elements in the sequence of map-matched sensor data elements between the first map-matched sensor data elements and the second map-matched sensor data elements retain time stamps associated with the sensor data.

14. The computer program product of claim 9, wherein the first value and the second value are user-configurable values.

15. The computer program product of claim 9, wherein the first value and the second value are established based on historical preferences of a user.

16. The computer program product of claim 9, wherein the sensor data defining the trajectory includes a starting location and an ending location, wherein the first value is based, at least in part, on the starting location, and the second value is based, at least in part, on the ending location.

17. A method comprising:
receiving sensor data defining a trajectory;
map-matching the sensor data using a map-matching algorithm to a plurality of road segments of a map database to generate a sequence of map-matched sensor data elements;
determining a first value representing anonymization associated with a start of the trajectory;
determining a second value representing anonymization associated with an end of the trajectory;
determining first map-matched sensor data elements at the start of the trajectory to be redacted based on the first value;
determining second map-matched sensor data elements at the end of the trajectory to be redacted based on the second value, wherein the second value comprises an integer identifying an amount of sensor data according to a functional class of a road segment of a corresponding map-matched sensor data element to be redacted from the sequence of map-matched sensor data elements; and
transmitting sensor data associated with elements in the sequence of map-matched sensor data elements between the first map-matched sensor data elements and the second map-matched sensor data elements.

18. The method of claim 17, wherein the sequence of map-matched sensor data elements comprises a sequence of map-matched sensor data and a road segment functional class of each map-matched sensor data element of the sequence.

19. The method of claim 18, wherein the first value comprises an integer identifying an amount of sensor data to be redacted from the sequence of map-matched sensor data elements.

20. The method of claim 17, wherein the first value comprises an integer identifying an amount of sensor data according to a functional class of a road segment of a corresponding map-matched sensor data element to be redacted from the sequence of map-matched sensor data elements.

\* \* \* \* \*